(12) United States Patent
Janajreh et al.

(10) Patent No.: US 11,214,487 B2
(45) Date of Patent: Jan. 4, 2022

(54) APPARATUSES FOR GASIFYING GLYCEROL USING SOLAR ENERGY, SYSTEMS INCLUDING THE APPARATUSES, AND METHODS OF USING THE APPARATUSES

(71) Applicant: Khalifa University of Science and Technology, Abu Dhabi (AE)

(72) Inventors: Isam Janajreh, Abu Dhabi (AE); Manar Al Mazrouei, Abu Dhabi (AE); Mohammed Noorul Hussain, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 301 days.

(21) Appl. No.: 16/222,119

(22) Filed: Dec. 17, 2018

(65) Prior Publication Data
US 2019/0263658 A1  Aug. 29, 2019

Related U.S. Application Data

(60) Provisional application No. 62/599,847, filed on Dec. 18, 2017.

(51) Int. Cl.
*C01B 3/22* (2006.01)
*B01J 19/24* (2006.01)

(52) U.S. Cl.
CPC ........... *C01B 3/22* (2013.01); *B01J 19/24* (2013.01); *C01B 2203/0272* (2013.01); *C01B 2203/0805* (2013.01)

(58) Field of Classification Search
CPC .................. C01B 3/22; B01J 19/24
USPC ........................................... 252/373
See application file for complete search history.

(56) References Cited

U.S. PATENT DOCUMENTS

| | | | |
|---|---|---|---|
| 7,601,524 B1* | 10/2009 | Seymour | C10K 1/101 435/162 |
| 2010/0242352 A1* | 9/2010 | Perkins | C01B 3/384 44/639 |
| 2010/0242354 A1* | 9/2010 | Perkins | C10J 3/485 44/639 |
| 2011/0220848 A1* | 9/2011 | Winkler | C01B 3/22 252/373 |
| 2016/0168493 A1* | 6/2016 | Stevenson | C10J 3/506 252/373 |
| 2017/0047887 A1* | 2/2017 | Hilliard | B64F 1/04 |

* cited by examiner

*Primary Examiner* — Douglas B Call
(74) *Attorney, Agent, or Firm* — Kilpatrick Townsend & Stockton LLP

(57) ABSTRACT

Apparatuses for gasifying glycerol using solar energy, system including the apparatuses, and methods of using the apparatuses are provided. The apparatuses may include a concentrated solar dish comprising an opening and a gasifying reactor comprising a chamber. An entrance of the chamber may be aligned to the opening. The apparatuses may also include a thermal insulator disposed on outer surfaces of the concentrated solar dish and the gasifying reactor and a pipe in the thermal insulator. The pipe may be configured to deliver glycerol into the chamber of the gasifying reactor in the form of atomized mist. The glycerol may be delivered to a portion of the chamber adjacent the opening.

19 Claims, 8 Drawing Sheets

APPARATUSES FOR GASIFYING GLYCEROL USING SOLAR ENERGY, SYSTEMS INCLUDING THE APPARATUSES, AND METHODS OF USING THE APPARATUSES

CROSS REFERENCE TO RELATED APPLICATION

The present application claims the benefit of U.S. Provisional Patent Application Ser. No. 62/599,847, filed Dec. 18, 2017, the disclosure of which is hereby incorporated herein in its entirety by reference.

FIELD

The present invention relates to apparatuses for gasification and methods of using the apparatuses.

BACKGROUND

A large amount of glycerol is produced from the biodiesel transesterification process. However, methods that valorize crude glycerol are very limited. The most common method is purification of glycerol to glycerin, which is used in cosmetic products. However this method may be economically not lucrative due to the abundance of glycerin in the market. Alternative methods are producing bio-methanol from glycerol, but the technology for such methods is not yet reliable to produce output efficiently.

SUMMARY

According to some embodiments of the present invention, apparatuses for gasifying glycerol are provided. The apparatuses may include a concentrated solar dish comprising an opening and a gasifying reactor comprising a chamber. An entrance of the chamber may be aligned to the opening. The apparatuses may also include a thermal insulator disposed on outer surfaces of the concentrated solar dish and the gasifying reactor and a pipe in the thermal insulator. The pipe may be configured to deliver glycerol into the chamber of the gasifying reactor.

According to some embodiments of the present invention, systems including apparatuses according to some embodiments of the present invention are provided. The systems may include the apparatuses, a glycerol tank, a glycerol supplying pipe connected between the glycerol tank and the pipe of the apparatus, a syngas tank configured to store syngas formed in the chamber, and a syngas discharging pipe connected between the chamber and the syngas tank. A portion of the syngas discharging pipe adjacent the chamber may be disposed adjacent the glycerol supplying pipe to heat the glycerol using heat of the syngas.

According to some embodiments of the present invention, methods of forming syngas by gasifying glycerol are provided. The methods may include supplying glycerol into a chamber of a gasifying reactor and decomposing the glycerol into syngas (i.e., a mixture including $H_2$ and CO) using a heat provided by solar energy.

DETAILED DESCRIPTION OF EMBODIMENTS

The present invention will now be described more fully hereinafter. This present invention may, however, be embodied in different forms and should not be construed as limited to the embodiments set forth herein. Rather, these embodiments are provided so that this disclosure will be thorough and complete and will fully convey the scope of the present invention to those skilled in the art.

The terminology used in the description of the present invention herein is for the purpose of describing particular embodiments only and is not intended to be limiting of the present invention. As used in the description of the present invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the present invention herein is for the purpose of describing particular embodiments only and is not intended to be limiting of the present invention.

Also as used herein, "and/or" refers to and encompasses any and all possible combinations of one or more of the associated listed items, as well as the lack of combinations when interpreted in the alternative ("or").

Unless the context indicates otherwise, it is specifically intended that the various features of the present invention described herein can be used in any combination. Moreover, the present invention also contemplates that in some embodiments of the present invention, any feature or combination of features set forth herein can be excluded or omitted. To illustrate, if the specification states that a complex comprises components A, B and C, it is specifically intended that any of A, B or C, or a combination thereof, can be omitted and disclaimed.

Figure 1:
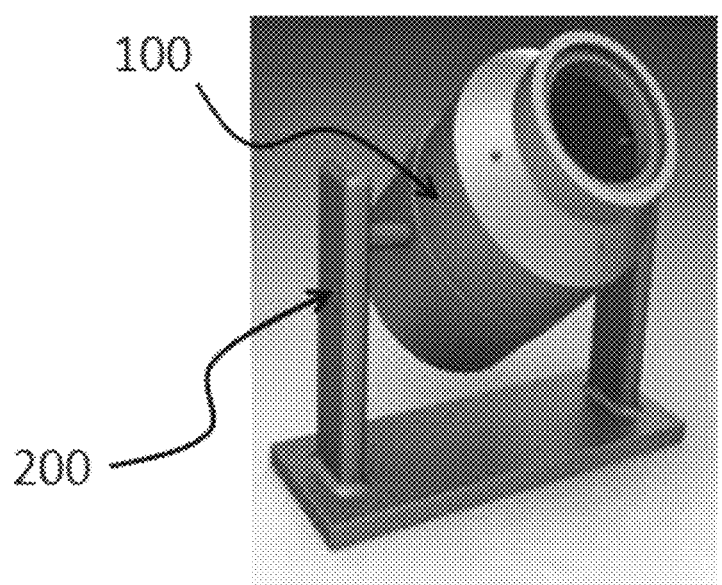
FIG. 1 is a digital image of an apparatus for gasifying glycerol and a support according to some embodiments of the present invention.

FIG. 1 a digital image of an apparatus for gasifying glycerol and a support according to some embodiments of the present invention. Referring to FIG. 1, an apparatus 100 may have a cylindrical shape. The apparatus 100 may be movably connected to a support 200 to orient the apparatus 100, e.g., toward the sun and may be rotated 360 degree. In some embodiments, the apparatus 100 is a solar assisted gasifier of 200 horsepower (hp).

Figure 2:
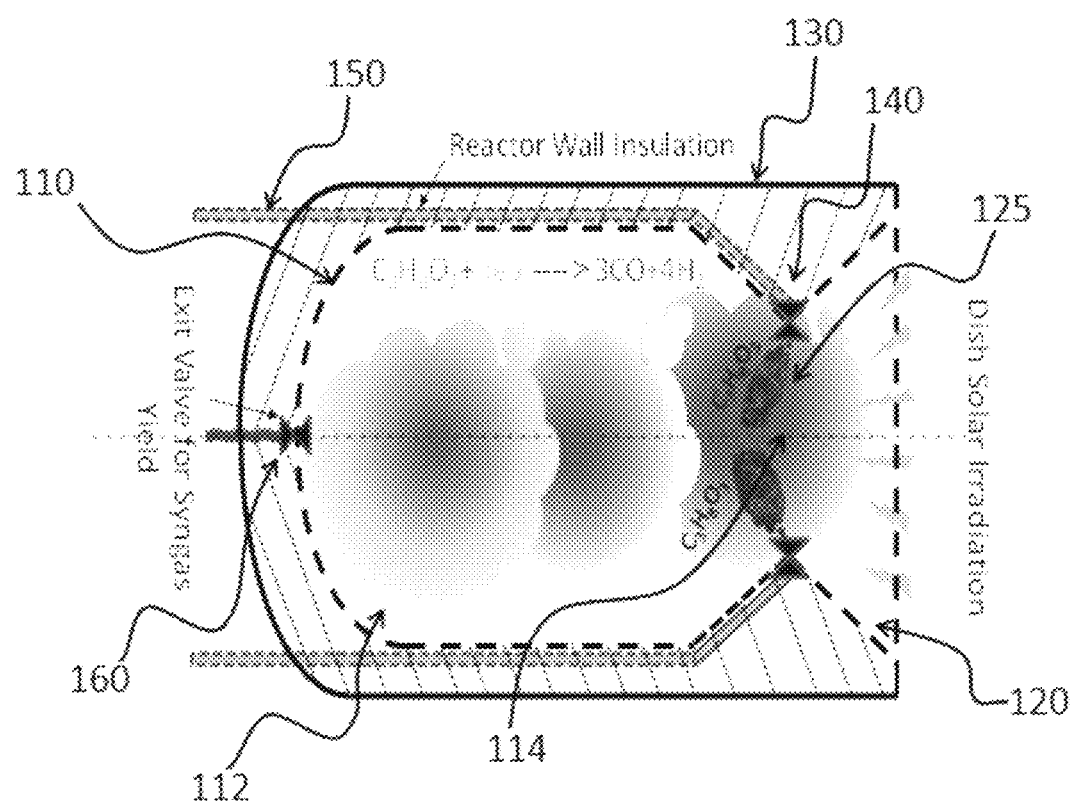
FIG. 2 is a cross-sectional view taken along a longitudinal direction of an apparatus for gasifying glycerol according to some embodiments of the present invention.

FIG. 2 is a cross-sectional view taken along a longitudinal direction of an apparatus for gasifying glycerol according to some embodiments of the present invention. Referring to FIG. 2, the apparatus 100 may include a gasifying reactor 110 including a chamber 112 and an entrance 114 (i.e., throat) of the chamber 112, and a concentrated solar dish 120 including an opening 125. It will be understood that the opening 125 can be considered as a throat of the apparatus. The apparatus 100 may also include a thermal insulator 130 that is disposed on outer surfaces of the concentrated solar dish and the gasifying reactor, and a pipe 150 disposed in the thermal insulator 130. The pipe 150 may deliver glycerol into the chamber 112. The thermal insulator 130 may include glass fibers.

The opening 125 of the concentrated solar dish 120 may be aligned to the entrance 114 of the chamber 112 such that the chamber 112 may be heated by solar irradiation. Solar energy provided by the concentrated solar dish 120 may raise an internal temperature of the chamber 112 above 700° C. (e.g., about 850° C.). In some embodiments, the entrance 114 of the chamber 112 has a diameter of about 5 cm, and the chamber 112 and the concentrated solar dish 120 of 100 suns may provide solar concentration of about 750 watt.

In some embodiments, a portion of the chamber 112 adjacent the concentrated solar dish 120 may taper toward the concentrated solar dish 120, as illustrated in FIG. 2. The tapered portion of the chamber 112 may enable solar heat to be concentrated near the gasifier throat (i.e., the portion of the chamber 112 adjacent the concentrated solar dish 120) where glycerol injection takes place and thereby locally intensifying the heat flux upon injection which needed for gasification. The apparatus 100 may include an injector 140 that is connected to the pipe 150 and may be disposed adjacent the entrance 114 of the chamber 112. The pipe 150 may extend along an outer surface of the gasifying reactor 110 to heat the glycerol using heat generated from the gasifying reactor 110. In some embodiments, the pipe 150 may directly contact the outer surface of the gasifying reactor 110 to heat the glycerol flowing through the pipe 150. Since the gasification of glycerol is a endothermic reaction, heating the glycerol will reduce energy need for the glycerol. Further, heating the glycerol may decrease viscosity of the glycerol.

The apparatus 100 may include multiple pipes 150 and multiple injectors 140, as illustrated in FIG. 2. The injectors 140 may be subjected to a controlled glycerol input by regulated pump that utilizes the low quality glycerol residual of the transesterification process. The apparatuses and methods of using the apparatuses may be flexible to accommodate any type of glycerol obtained from, for example, biomass or animal based tallow. In some embodiments, the glycerol may be injected into the apparatus in the form of atomized mist.

As illustrated in FIG. 2, the gasifying reactor 110 may include an end portion opposite the entrance 114 of the chamber 112, and an outlet 160 may be disposed in the end portion of the gasifying reactor 110. The apparatus 100 may discharge syngas (e.g., a mixture including $H_2$ and CO) generated in the chamber through the outlet 160. The outlet 160 may be an axial exit valve.

Figure 3:
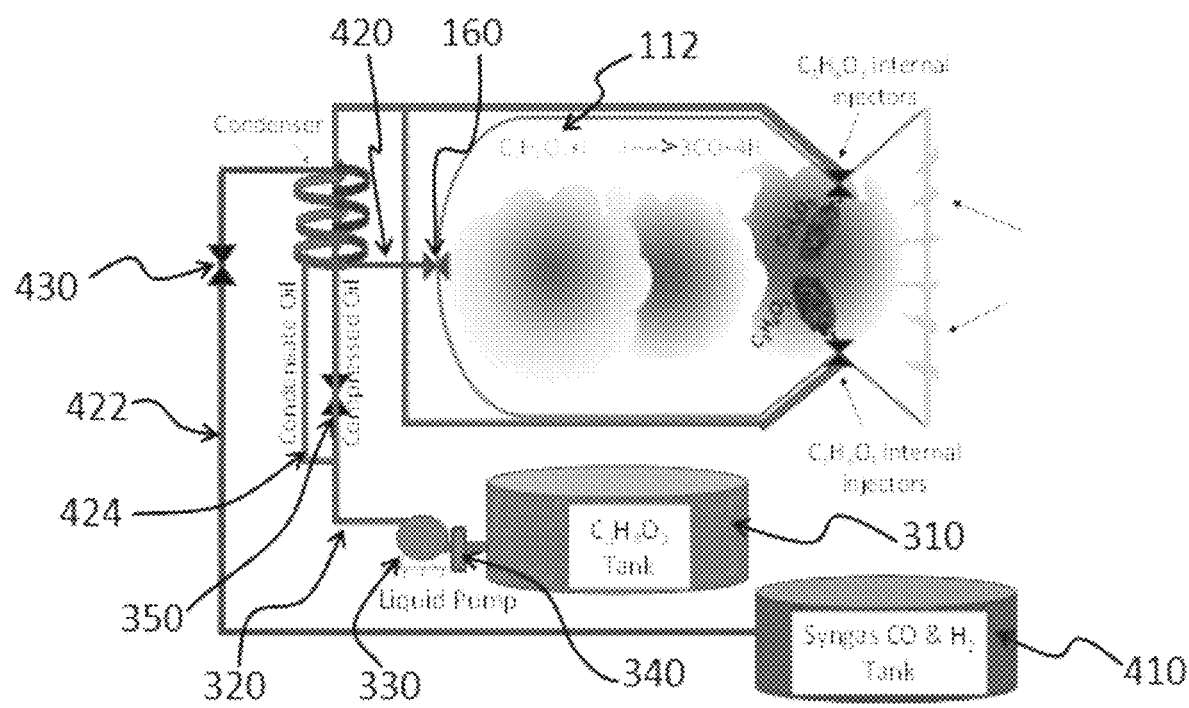
FIG. 3 is a schematic diagram of a system including an apparatus for gasifying glycerol according to some embodiments of the present invention.

FIG. 3 is a schematic diagram of a system including an apparatus for gasifying glycerol according to some embodiments of the present invention. Referring to FIG. 3, a system may include a glycerol tank 310 and a glycerol supplying pipe 320 that is connected between the glycerol tank and the pipe 150 of the apparatus 100, a syngas tank 410 that is configured to store syngas formed in the chamber 112, and a syngas discharging pipe 420 connected between the chamber 112 and the syngas tank 410.

A portion of the syngas discharging pipe 420 adjacent the chamber 112 is disposed adjacent the glycerol supplying pipe 320 to heat the glycerol using heat of the exiting syngas. Heat exchange between the exiting syngas and the incoming glycerol may be performed adjacent the outlet 160 and may be performed using, for example, a condenser, while the glycerol and the syngas flow opposite direction. It will be understood that the glycerol is used as a heat rejection fluid and may be vaporized or misted. Accordingly, in some embodiments, the glycerol may be heated twice after being drained from the glycerol tank 310 and before supplying into the chamber 112 of the apparatus 100. The glycerol may be heated by heat of the syngas exiting the chamber 112, and then the glycerol may be heated by heat generated from the gasifying reactor 110.

In some embodiments, the exiting syngas may be split into two streams, first one is the non-condensate syngas and second one is the condensate liquid and tar, after heating the glycerol. The non-condensate syngas may proceed to the syngas tank 410 through a collecting pipe 422, and the condensate liquid and tar may be merged with the incoming cold glycerol through a merging pipe 424. The system may also include valves 350 and 430.

In some embodiments, the glycerol may be the only reactant for formation of the syngas in the chamber 112, and the syngas may be formed by thermal decomposition of the glycerol, as illustrated in FIG. 3. The system may also include a pump 330 that is connected to the glycerol tank 310 to pump the glycerol into the glycerol supplying pipe 320 and a filter 340 that is disposed between the glycerol tank 310 and the pump 330 to filter out suspended solids to reduce or possibly prevent clogging. The filter 340 may be similar to vehicle filters. In some embodiments, the glycerol may be obtained as a byproduct from the transesterification process in which waste cooking oil from restaurants and residents is converted to biodiesel and glycerol.

Figure 4:
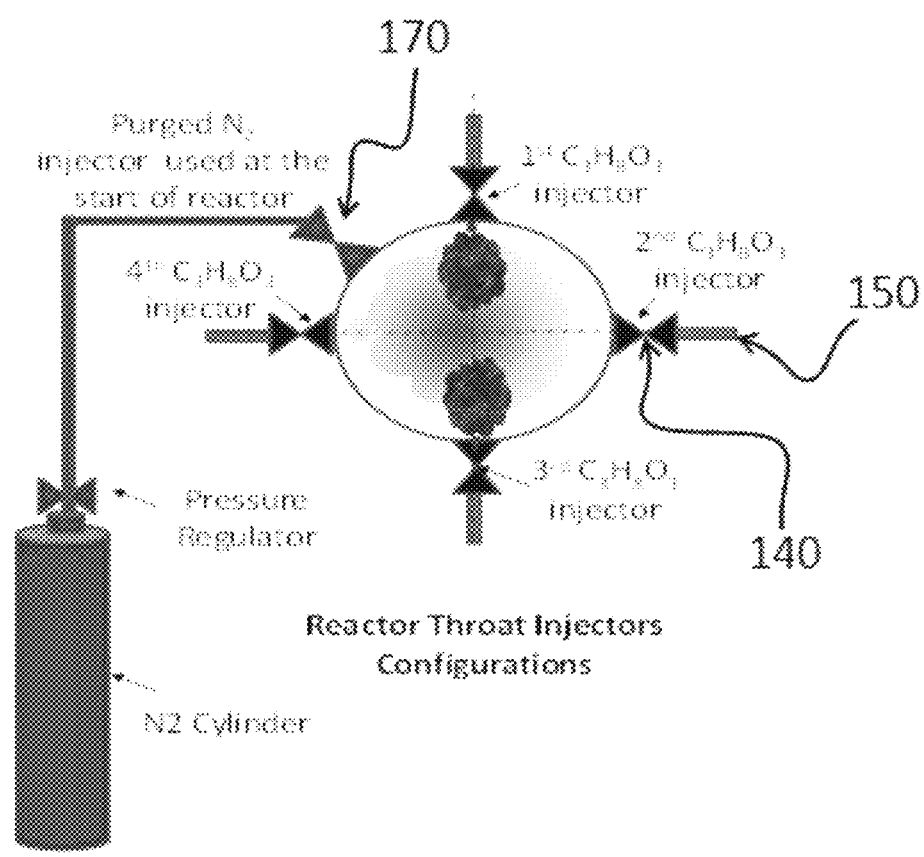
FIG. 4 is a schematic diagram of a configuration of injectors according to some embodiments of the present invention.

FIG. 4 is a schematic diagram of a configuration of injectors according to some embodiments of the present invention. Referring to FIG. 4, in some embodiments, the apparatus 100 may include four injectors 140 through which the glycerol are injected, and four pipes 150 that are connected to the four injectors 140, respectively. The four injectors 140 may be disposed along an outer circumference of the gasifying reactor 110 and may be spaced apart from each other by an equal distance. The apparatus 100 may also include a nitrogen injector 170 through which nitrogen gas is injected into the chamber 112 of the gasifying reactor 110. The nitrogen injector 170 may be disposed between two adjacent injectors 140.

According to some embodiments of the present invention, methods of forming syngas by gasifying glycerol are provided. The methods may include supplying glycerol into a chamber 112 of a gasifying reactor 110 and decomposing the glycerol into syngas (i.e., a mixture including $H_2$ and CO) using a heat provided by solar energy. In some embodiments, the heat provided by solar energy may be provided by a concentrated solar dish 120 that is connected to an entrance 114 of the chamber 112. As the glycerol is subjected to a high internal temperature of the gasifying reactor 110 nearly 600° C., the glycerol may start to break/crake into its elemental compositions which then converts into syngas including 3CO and 4H$_2$ per one glycerol mole.

In some embodiments, before supplying the glycerol into the chamber 112 of the gasifying reactor 110, nitrogen gas may be injected into the chamber 112 through the nitrogen injector 170 until the chamber 112 is substantially devoid of oxygen to reduce or possibly prevent combustion of the glycerol. Accordingly, the gasification of glycerol substantially may not involve combustion of the glycerol, and thus the syngas may be substantially devoid of NO$_x$ and SO$_x$. It will be understood that since the syngas is substantially devoid of NO$_x$ and SO$_x$, the syngas may be used without additional purification processes.

In some embodiments, supplying the glycerol into the chamber 112 may include injecting the glycerol into the chamber 112 through an injector 140 disposed adjacent an entrance 114 of the chamber 112 (e.g., a portion of the chamber 112 connected to the concentrated solar dish 120), as illustrated in FIG. 2. In some embodiments, the injector 140 may include multiple injectors (e.g., four injectors), as illustrated in FIGS. 2 and 4, and the injectors 140 may be disposed along an outer circumference of the gasifying reactor 110 and are spaced apart from each other by an equal distance.

In some embodiments, supplying the glycerol into the chamber 112 may include supplying the glycerol through a pipe 150 that is disposed adjacent the gasifying reactor 110 and heating the glycerol that flows through the pipe 150 using heat generated from the gasifying reactor 110. The pipe 150 may directly contact the gasifying reactor 110. The methods may further include discharging the syngas to a syngas discharging pipe 420 connected to the chamber 112 through the outlet 160. In some embodiments, supplying the glycerol into the chamber may include heating the glycerol using heat of the syngas exiting the chamber 112.

The gasifying reactor 110 and the concentrated solar dish 120 may be thermally insulated by an insulator (e.g., a thermal insulator comprising glass fibers) to maintain an internal temperature of the chamber 112 high, and for example, the internal temperature of the chamber 112 may be maintained above 700° C. (e.g., about 850° C.) while the gasification is performed.

In some embodiments, the glycerol may be the only reactant for formation of the syngas, and the methods may further include moving (e.g., rotating) the concentrated solar dish to orient the concentrated solar dish toward the Sun.

Figure 5:
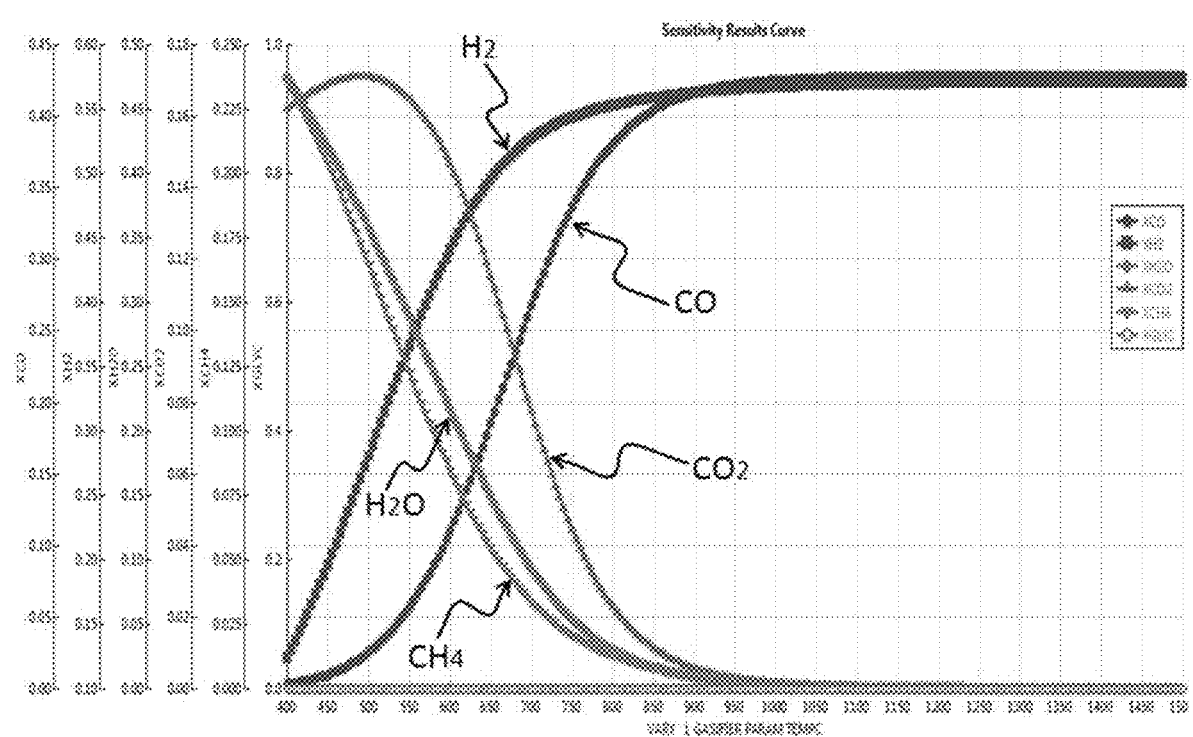
FIG. 5 is a graph showing prediction of main gasification species as function of a reactor temperature.
Figure 6:
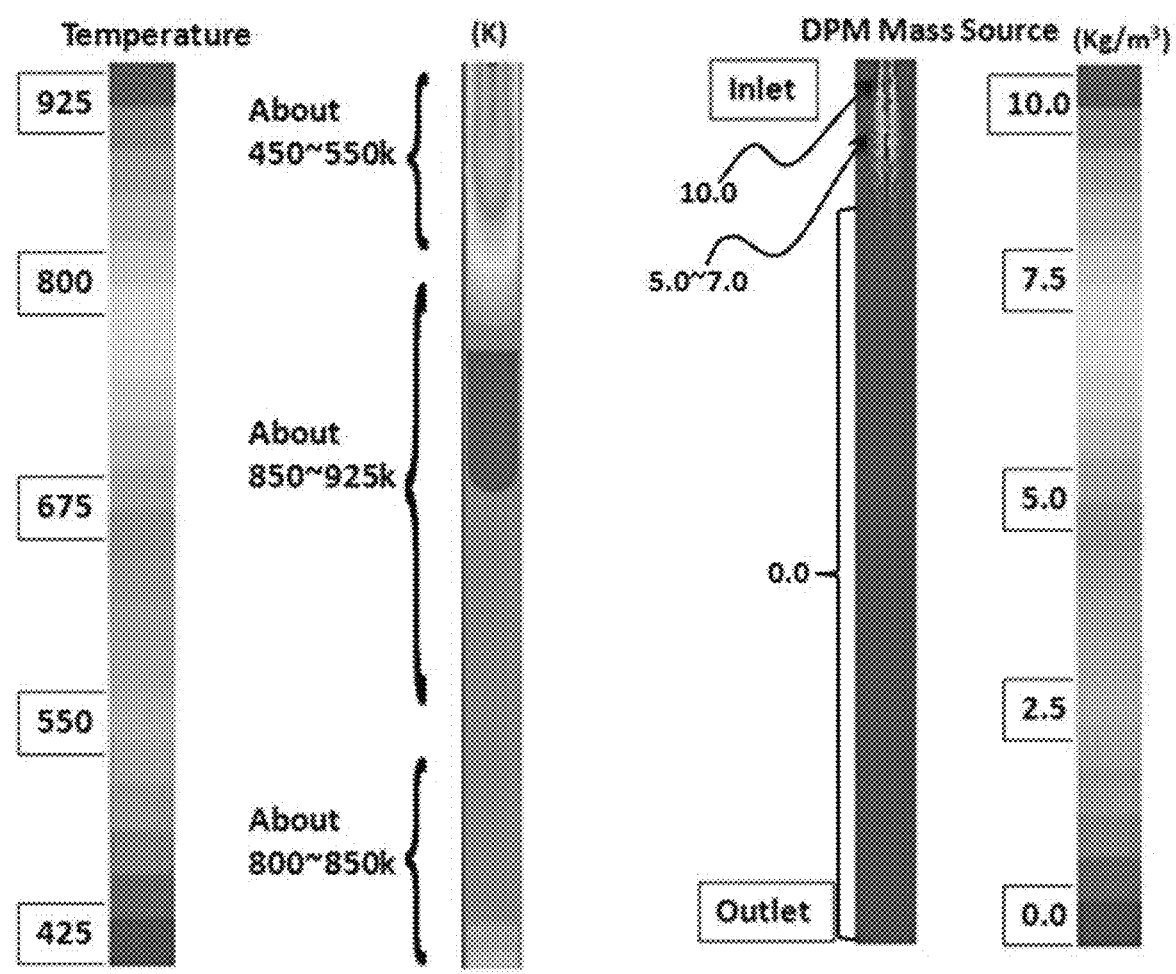
FIG. 6 shows a chart illustrating an internal temperature of a reactor according to some embodiments of the present invention and a contours plot of the glycerol injection, marked as Discrete Phase Model (DPM).
Figure 7:
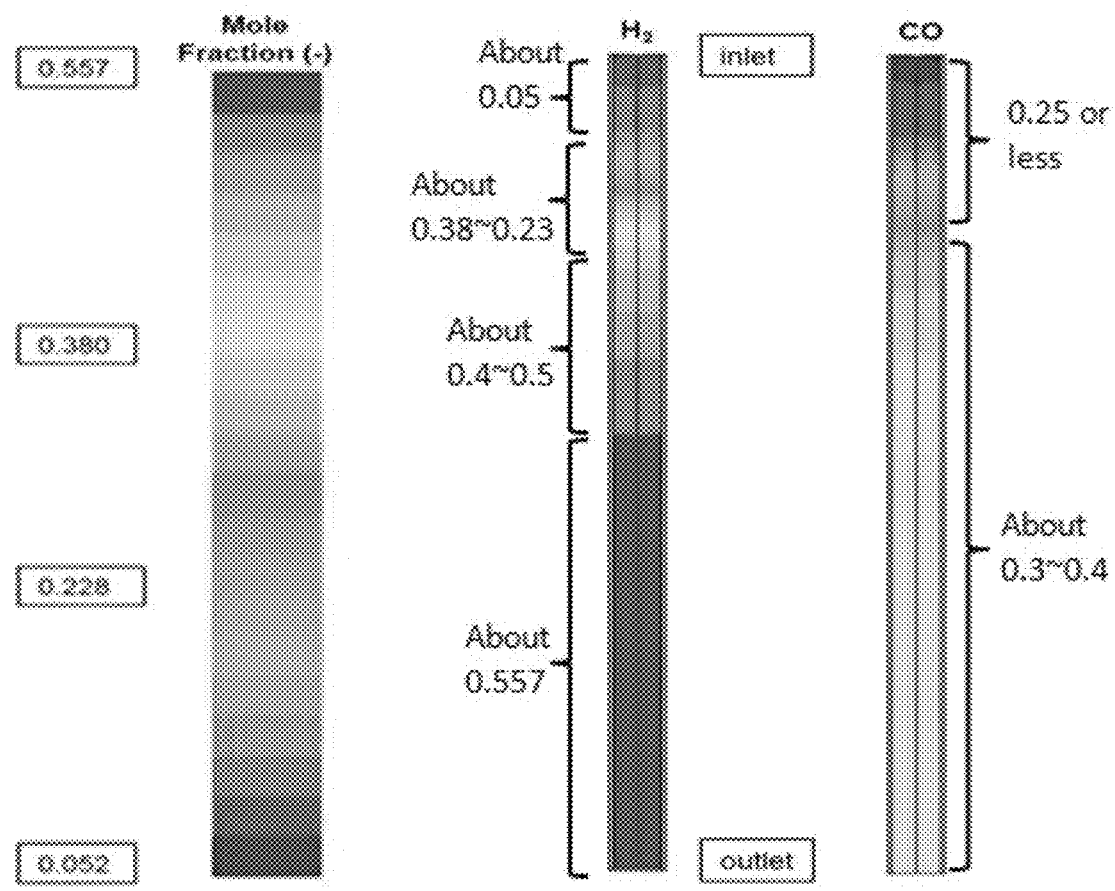
FIG. 7 is a chart illustrating mole fractions of $H_2$ and CO according to some embodiments of the present invention.

FIG. 5 is a graph showing prediction of main gasification species (e.g., CO, CO$_2$, H$_2$, H$_2$O, and CH$_4$) as function of a reactor temperature. FIG. 6 shows a chart illustrating an internal temperature of a reactor according to some embodiments of the present invention and a contours plot of the glycerol injection, marked as Discrete Phase Model (DPM). It illustrates how fast the devolatalization takes place. FIG. 7 is a chart illustrating mole fractions of H$_2$ and CO according to some embodiments of the present invention. The prediction is based on minimum chemical energy potential using Gibbs energy for the mentioned species. The prediction is based on high fidelity reactive flow of multiple species where the glycerol is injected as droplets subjected to heating, evaporation and gasification modeling. Referring to FIG. 5, an internal temperature of the gasifying reactor 110 may need to be higher than 700° C. to reduce CO$_2$, H$_2$O and CH$_4$. As appreciated by the present inventors, dish-type solar concentrators may raise an internal temperature of the gasifying reactor 110 above 700° C. since dish solar concentrators are efficient. Further, the present inventors appreciated that the dish/reactor system is modular such that both (reactor and the solar dish) can be scaled up from 100 watts to 1MW.

Referring to FIGS. 6 and 7, the results indicate that the endothermic reaction proceeds at the entry (top) of the gasifying reactor 110 and thus the temperature is low at the upstream at least partially because of the evaporation of the injected glycerol droplets shortly following their injection and the formation of the H$_2$ and CO species. Mole fractions of both H$_2$ and CO species follow the high temperature trend/distribution inside the gasifying reactor 110.

Figure 8:
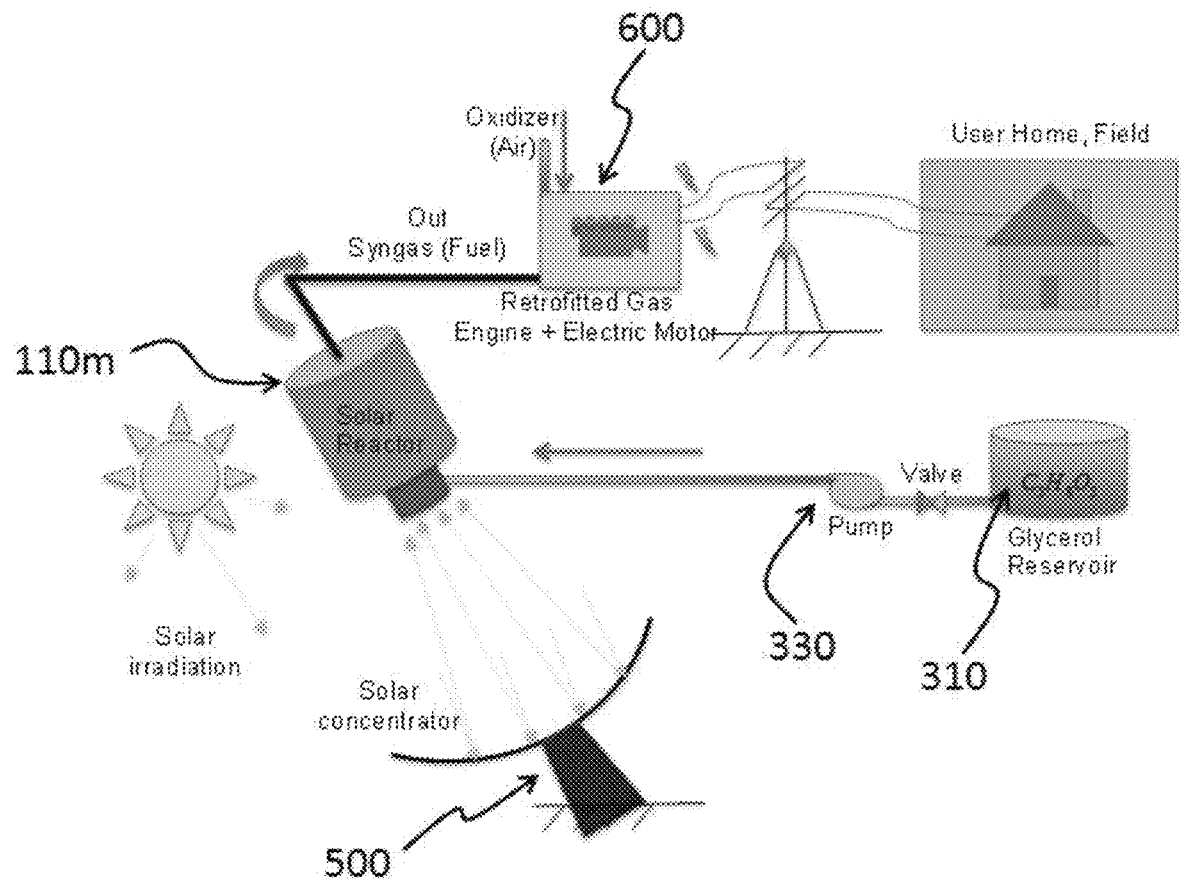
FIG. 8 is a schematic diagram of a system including an apparatus for gasifying glycerol according to some embodiments of the present invention.

FIG. 8 is a schematic diagram of a system including an apparatus for gasifying glycerol according to some embodiments of the present invention. Referring to FIG. 8, an apparatus for gasifying glycerol according to some embodiments of the present invention may be integrated to a small power island which may include a solar assisted gasifier 110m, a small size solar dish 500, a glycerol tank 310, a feed pump 330 and an electric power source, which includes, for example, an Internal Combustion Engine (ICE) and an electric motor. The solar dish 500 may provide up to 25-100 focalized sun to the solar assisted gasifier 110m.

Although FIG. 8 shows the solar dish 500 that is separated from the solar assisted gasifier 110m, the solar dish 500 and the solar assisted gasifier 110m may be merged into a single apparatus 100 as illustrated in FIG. 2.

The system may convert solar thermal energy to chemical energy in the form of enthalpy of reaction. The gasification process according to some embodiments of the present invention may not include direct combustion of glycerol, a high quality of syngas (e.g., the syngas may not include NO$_x$ and SO$_x$) may be produced and may not require any necessary cleanup. The syngas may be directed to a retrofit ICE that runs on straight gasoline or may be fired with the gasoline when the sun light is available. The electrical power generated may be supply directly to the household appliances or lightings of a home.

Comparison of the solar technologies for solar assisted pyrolysis is depicted in Table 1 based on DOE study. The highest attained reactor temperature and higher peak efficiency favor the dish application compared to Parabolic Trough and Power Tower. The insulation of the reactor can increase the attained reactor temperature near 850° C. which is the desired reactor temperate under which near complete conversion may take place.

TABLE 1

Characteristics of solar thermal electric power systems.

| | Parabolic Trough | Power Tower | Dish/Engine |
|---|---|---|---|
| Size | 30-320 MW* | 10-200 MW* | 5-25 kW* |
| Operating Temperature (° C./° F.) | 390/734 | 565/1,049 | 750/1,382 |
| Annual Capacity Factor | 23-50%* | 20-77%* | 25% |
| Peak Efficiency | 20%(d) | 23%(p) | 29.4%(d) |

TABLE 1-continued

Characteristics of solar thermal electric power systems.

|  | Parabolic Trough | Power Tower | Dish/Engine |
|---|---|---|---|
| Net Annual Efficiency | 11(d')-16%* | 7(d')-20%* | 12-25%*(p) |
| Commercial Status | Commercially Available | Scale-up Demonstration | Prototype Demonstration |
| Technology Development Risk | Low | Medium | High |
| Storage Available | Limited | Yes | Battery |
| Hybrid Designs | Yes | Yes | Yes |
| Cost |  |  |  |
| $/m$^2$ | 630-275* | 475-200* | 3,100-320* |
| $/W | 4.0-2.7* | 4.4-2.5* | 12.6-1.3* |
| $/W_p$† | 4.0-1.3* | 2.4-0.9* | 12.6-1.1* |

*Values indicate changes over the 1997-2030 time frame.

†$/W_p$ removes the effect of thermal storage (or hybridization for dish/engine). See discussion of thermal storage in the power tower TC and footnotes in Table 4.

(p)= predicted;

(d)= demonstrated;

(d')= has been demonstrated, out years are predicted values

Heat Generation

Referring again to FIG. 2, the glycerol is injected into the gasifying reactor 110, and the solar energy provides heat required to break the glycerol bondage into syngas according to Equation 1 below:

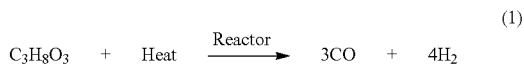

$$C_3H_8O_3 + \text{Heat} \xrightarrow{\text{Reactor}} 3CO + 4H_2 \quad (1)$$

The required heat is governed by the energy Equation 2 and is written as:

$$\Sigma_{Reactant} n_i h_i = \Sigma_{Product} n_i h_i + Q \quad (2)$$

$h_i$ is the total enthalpy including the formation enthalpy and any additional sensible enthalpy and is described per unit mole as expressed in Equation 3 below:

$$h_i = h_f + h_{sensible} \text{ where } h_{sensible} = C_p(T_f - T_{ref}) \quad (3)$$

$n_i$ of Equation 2 is the molar or stoichiometric coefficient per the values given in Equation 1 and corresponds to reactants and products. Cp is the specie specific heat and T is the temperature where f and ref denoted the final and reference or the ambient temperature. Q is the net added process heat, which is the fraction of the irradiation heat minus the heat loss due to convection as expressed in Equation 4:

$$Q = \beta I C_R - K(T_c - T_a) \quad (4)$$

β is the fraction of heat absorbed, which depends on the orientation and transmissive and absorbtive properties of the optical glass window and can reach as 80% at its best, and I is the irradiance. $C_R$ is the concentration ratio, K is the overall heat transfer coefficient, and T is the temperature where c and a are referred to the collector and the environment, respectively. The $C_R$ for the spherical shape such as dish is much higher than the cylindrical such as the trough and these are expressed in Equation 5 as:

$$C_{R_{Sphere}} = 11560\left(\frac{D_m}{F}\right)^2 \text{ and } C_{R_{Cylinder}} = 107.5\frac{D_m}{F} \quad (5)$$

$D_m$ is the mirror dimension, and F is the focal length.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope is to be determined by the broadest permissible interpretation of the following claims and their equivalents, and shall not be restricted or limited by the foregoing detailed description.

What is claimed is:

1. An apparatus for gasifying glycerol, the apparatus comprising:

a concentrated solar dish comprising an opening;

a gasifying reactor comprising a chamber comprising a top defining an entrance, a bottom opposite the top and defining an outlet port, and sides extending between the top and the bottom, the chamber configured to contain syngas generated in the chamber, wherein the entrance of the chamber is aligned with the opening of the concentrated solar dish;

a thermal insulator disposed on outer surfaces of the concentrated solar dish and the gasifying reactor;

an output pipe coupled with the outlet port, the output pipe configured to transport syngas generated in the chamber; and an input pipe extending through the thermal insulator and positioned such that a portion of the input pipe contacts an exterior surface of the sides of the chamber, wherein the input pipe is configured to deliver glycerol into the chamber of the gasifying reactor.

2. The apparatus of claim 1, wherein a portion of the chamber adjacent the concentrated solar dish tapers toward the concentrated solar dish.

3. The apparatus of claim 1, further comprising an injector that is connected to the input pipe and is disposed adjacent the entrance of the chamber.

4. The apparatus of claim 3, wherein the input pipe is one of a plurality of input pipes, the injector is one of a plurality of injectors, and each of the plurality of injectors is connected to a respective one of the plurality of input pipes, and wherein the plurality of injectors are disposed along an outer circumference of the gasifying reactor and are spaced apart from each other by an equal distance.

5. The apparatus of claim 4, wherein a number of the plurality of injectors is four.

6. The apparatus of claim 1, wherein heat from the chamber causes a rise in the temperature of the glycerol being delivered into the chamber of the gasifying reactor.

7. The apparatus of claim 1, further comprising a nitrogen injector through which nitrogen gas is injected into the chamber of the gasifying reactor.

8. The apparatus of claim 1, wherein the concentrated solar dish is configured to raise an internal temperature of the chamber above 700° C.

9. The apparatus of claim 1, further comprising a support, wherein the gasifying reactor is movably connected to the support to orient the concentrated solar dish toward the Sun.

10. The apparatus of claim 9, wherein the thermal insulator comprises glass fibers.

11. A system comprising the apparatus of claim 1, the system comprising:
- a glycerol tank;
- a glycerol supplying pipe connected between the glycerol tank and the input pipe of the apparatus;
- a syngas tank configured to store syngas formed in the chamber; and
- a syngas discharging system extending between the output pipe and the syngas tank, the syngas discharging system having a first portion coupled to the output pipe and a second portion coupled with the syngas tank,
- wherein the first portion of the syngas discharging system is positioned such that heat from the syngas in the syngas discharging system heats the glycerol in the glycerol supplying pipe.

12. The system of claim 11, wherein the glycerol is the only reactant for formation of the syngas in the chamber.

13. The system of claim 12, further comprising:
- a pump connected to the glycerol tank to pump the glycerol into the glycerol supplying pipe; and
- a filter disposed between the glycerol tank and the pump to filter out suspended solids.

14. The system of claim 11, wherein the syngas discharging system comprises a first pipe configured to transport non-condensate syngas to the syngas tank and a second pipe configured to transport condensate liquid and tar.

15. The system of claim 14, wherein a condenser is positioned between the output pipe and the second pipe, the condenser configured to condense the syngas to form the condensate liquid and tar.

16. A method of forming syngas by gasifying glycerol, the method comprising:
- supplying glycerol into a chamber of a gasifying reactor, the chamber having an entrance connected to and aligned with an opening of a concentrated solar dish, wherein the glycerol is supplied to the chamber through an input pipe extending through a thermal insulator disposed on outer surfaces of the concentrated solar dish and the gasifying reactor, the input pipe positioned such that a portion of the input pipe contacts an exterior surface of the chamber;
- decomposing the glycerol into syngas using a heat provided by solar energy provided by the concentrated solar dish; and
- transporting the syngas from the chamber through an output pipe coupled with an outlet port of the chamber.

17. The method of claim 16, further comprising purging nitrogen gas into the chamber of the gasifying reactor before supplying the glycerol until the chamber is substantially devoid of oxygen.

18. The method of claim 16, wherein supplying the glycerol into the chamber comprises injecting the glycerol into the chamber through an injector disposed adjacent an entrance of the chamber.

19. The method of claim 16, wherein supplying the glycerol into the chamber comprises:
- supplying the glycerol through a pipe that is disposed adjacent the gasifying reactor; and
- heating the glycerol flowing through the pipe using heat generated from the gasifying reactor.

* * * * *